United States Patent
Lipiansky et al.

(10) Patent No.: US 8,344,246 B2
(45) Date of Patent: Jan. 1, 2013

(54) COOLING DISC FOR BUNDLES OF CURRENT CARRYING CABLES

(75) Inventors: Eduardo M. Lipiansky, Danville, CA (US); Pascal C. Kam, Union City, CA (US)

(73) Assignee: Google Inc., Mountain View, CA (US)

( * ) Notice: Subject to any disclaimer, the term of this patent is extended or adjusted under 35 U.S.C. 154(b) by 282 days.

(21) Appl. No.: 12/754,956

(22) Filed: Apr. 6, 2010

(65) Prior Publication Data
US 2011/0240341 A1 Oct. 6, 2011

(51) Int. Cl.
*H01B 11/00* (2006.01)
(52) U.S. Cl. ............... 174/27; 174/28; 174/135
(58) Field of Classification Search .......... 174/15.6, 174/27, 28, 135
See application file for complete search history.

(56) References Cited

U.S. PATENT DOCUMENTS

| | | | |
|---|---|---|---|
| 1,089,642 A | 3/1914 | Honold | |
| 5,027,478 A | 7/1991 | Suhr | |
| 5,742,982 A * | 4/1998 | Dodd et al. | 24/16 R |
| 6,353,186 B1 * | 3/2002 | Dams et al. | 174/667 |
| 7,518,058 B1 | 4/2009 | Hagbrandt et al. | |

FOREIGN PATENT DOCUMENTS
CA 2475261 A1 1/2006

OTHER PUBLICATIONS

"Line Spacer for 8 Bundle Conductors" [online] [retrieved on Jul. 22, 2010]. Retrieved from the Internet: <URL:http://supremeco.tradeindia.com/Exporters_Suppliers/Exporter15401.231541/Line-Spacer-for-8-Bundle-Conductor.html>. 2 pages.
Belden "Hook-Up and Lead Wire" Catalog, retrieved from the Internet Jan. 12, 2010, 32 pages.
International Search Report and Written Opinion, PCT/US2011/028811, dated May 24, 2011.

* cited by examiner

*Primary Examiner* — Chau Nguyen
(74) *Attorney, Agent, or Firm* — Lerner, David, Littenberg, Krumholz & Mentlik, LLP

(57) ABSTRACT

Aspects of the invention pertain to cooling bundles of power distribution cables or other current carrying cables. Such cables give off heat, especially when carrying high current loads. One or more cooling members are used to secure multiple cables. The cables may be placed about a generally circular shaped member which has a central opening. Receptacles are placed along an outer perimeter of the cooling member to secure the cables. The thickness of each cooling member may vary. When multiple cooling members are used, they may be spaced at least 6 inches apart. The cooling members may be fabricated from a nonconductive material such as PVC.

17 Claims, 7 Drawing Sheets

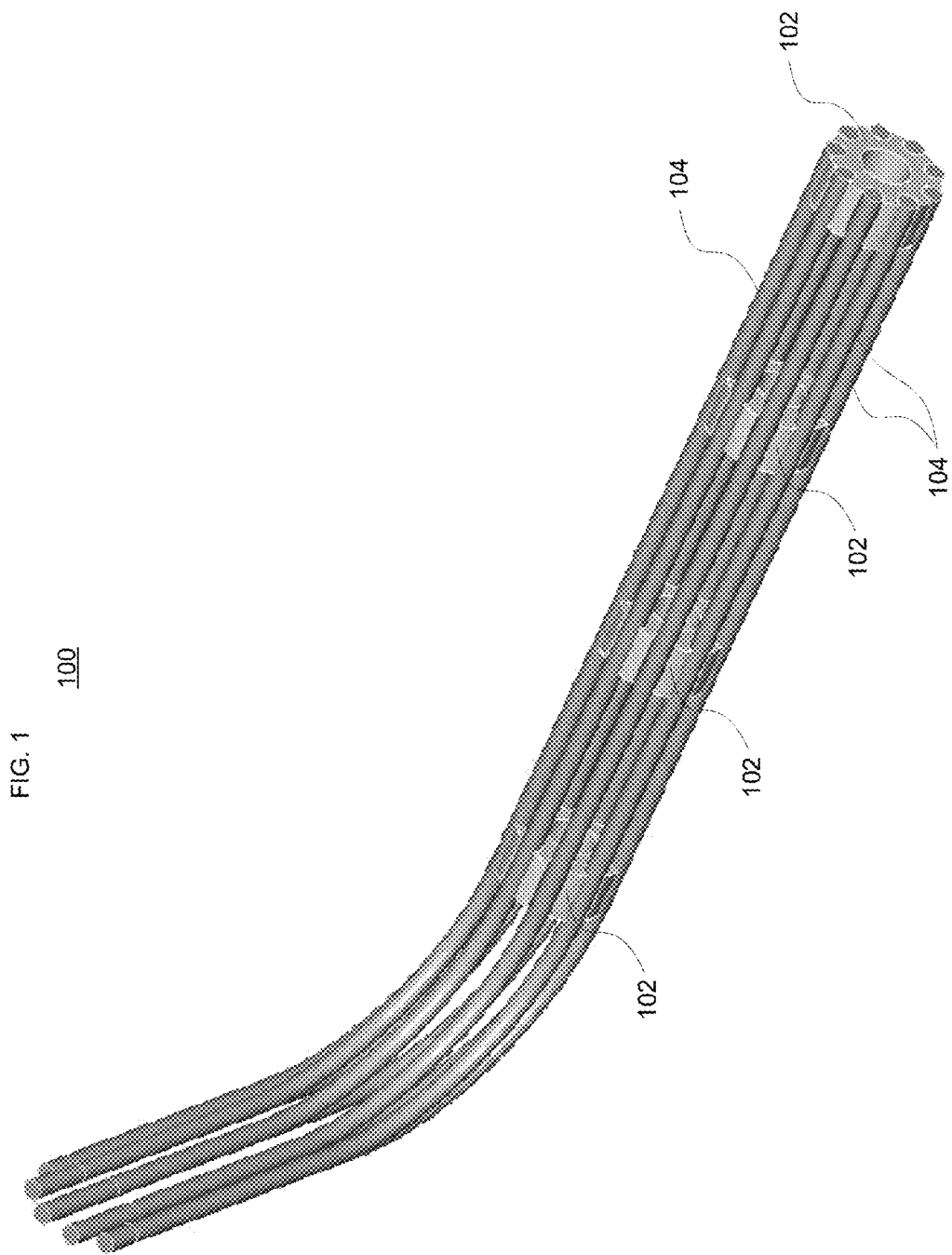

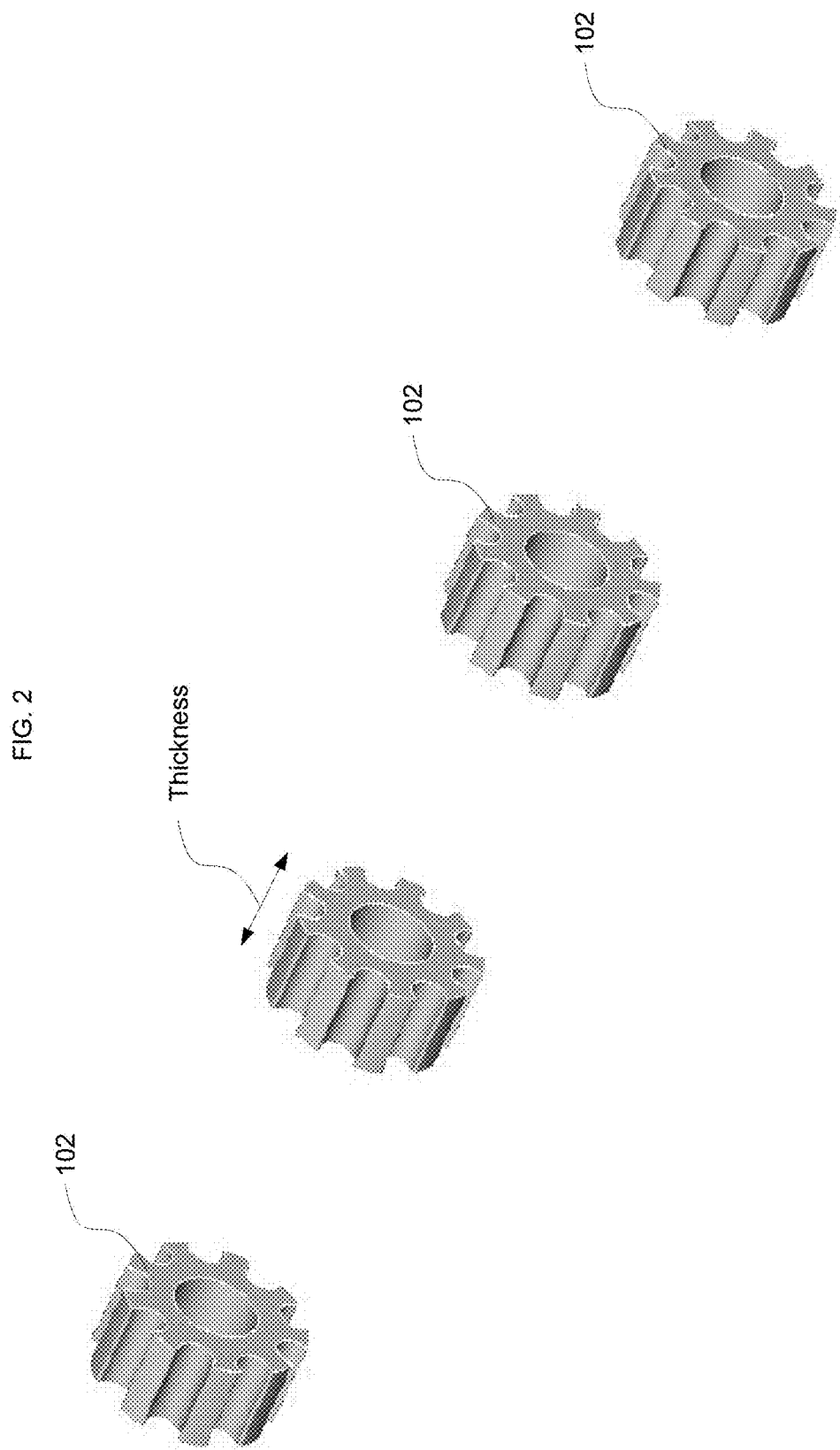

200

COOLING DISC FOR BUNDLES OF CURRENT CARRYING CABLES

BACKGROUND OF THE INVENTION

1. Field of the Invention

Aspects of the invention relate generally to heat dissipation in power distribution systems. More particularly, aspects provide cooling of current carrying cable bundles.

2. Description of Related Art

Power distribution systems are used in many different applications such as large scale computer systems. Such systems often use multiple cables, and each cable may support a high current. Often, two or more current carrying cables are bundled together using tie-wraps (cable ties) or other equipment. Bundling allows for convenient handling of the cables and gives the appearance of an orderly arrangement.

Unfortunately, current carrying cables dissipate heat. Bundling such cables together prevents efficient heat dissipation per unit time, as it keeps more heat within the core of the bundle. This may reduce the current carrying capability of the cables. It may also reduce the useful life of a given cable and may cause a fire hazard. It is possible to increase the insulation surrounding each cable. However, this increases the size and expense of the cables.

SUMMARY OF THE INVENTION

In accordance with aspects of the invention, one or more cooling discs are used to secure multiple current carrying cables while spreading the cables out in an organized manner. The cooling discs provide an efficient spatial distribution of heat so that the amount of power dissipated over time is distributed over a larger volume, effectively cooling the cables. Thus, it is not necessary to derate the cables.

In accordance with one embodiment, a cooling apparatus comprises at least one cooling member having an outer perimeter and an inner perimeter. The outer perimeter includes a plurality of receptacles for receiving a corresponding one of a plurality of current carrying cables. The inner perimeter defines a central opening. Each receptacle has a cross-sectional size conforming to a cross-sectional size of the corresponding cable. And each receptacle has a pair of opposing outer lips having a spacing therebetween. The spacing is less than a diameter of the corresponding cable.

In one example, the receptacles have a generally arcuate shape. In this case, the inner perimeter is desirably generally circular. In another example, the at least one cooling member is a thermal and electric insulator. Here, the at least one cooling member desirably comprises a thermoplastic polymer.

In a further example, the at least one cooling member comprises a plurality of cooling members, each of the plurality of cooling members having a thickness of less than one inch. In one alternative, upon connection to the plurality of cables, a first one of the cooling members is spaced apart from a second one of the cooling members by at least about 6 inches. In another alternative, upon connection to the plurality of cables, a first one of the cooling members is spaced apart from a second one of the cooling members by less than about 12 inches. And in another example, the at least one cooling member has a thickness of between about 0.25 to 0.5 inches.

In accordance with another embodiment, a cooling system comprises a plurality of cooling members and a plurality of cables configured to handle current loads. Each cooling member has an outer perimeter and an inner perimeter. The outer perimeter includes a plurality of receptacles therealong. The inner perimeter defines a central opening. Each of the plurality of cables will generate heat in relation to its current load. Each of the plurality of cables has a cross-sectional size. Each receptacle receives a corresponding one of the plurality of cables. Each receptacle has a cross-sectional size conforming to the cross-sectional size of the corresponding cable, and each receptacle has a pair of opposing outer lips having a spacing therebetween. The spacing is less than a diameter of the corresponding cable.

In one example, the receptacles have a generally arcuate shape. In another example, the inner perimeter is generally circular. In a further example, the cooling members are thermal and electric insulators. Here, the cooling members desirably comprise a thermoplastic polymer.

In yet another example, each of the plurality of cooling members has a thickness of less than one inch. In one alternative, each cooling member is spaced apart from any neighboring cooling members by at least about 6 inches. And in another alternative, each cooling member is spaced apart from any neighboring cooling members by less than about 12 inches.

BRIEF DESCRIPTION OF THE DRAWINGS

FIG. 1 illustrates a cooling system in accordance with aspects of the invention.

FIG. 2 illustrates features of the system of FIG. 1.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

As noted above, current carrying cables may dissipate significant heat per unit time. This is a function of the amount of current which is carried by the cables, the thickness of the conducting material, the insulation and the cooling and ventilation available. By way of example, the current may be 30 Amps per cable or more, depending upon the application.

Figure 7:
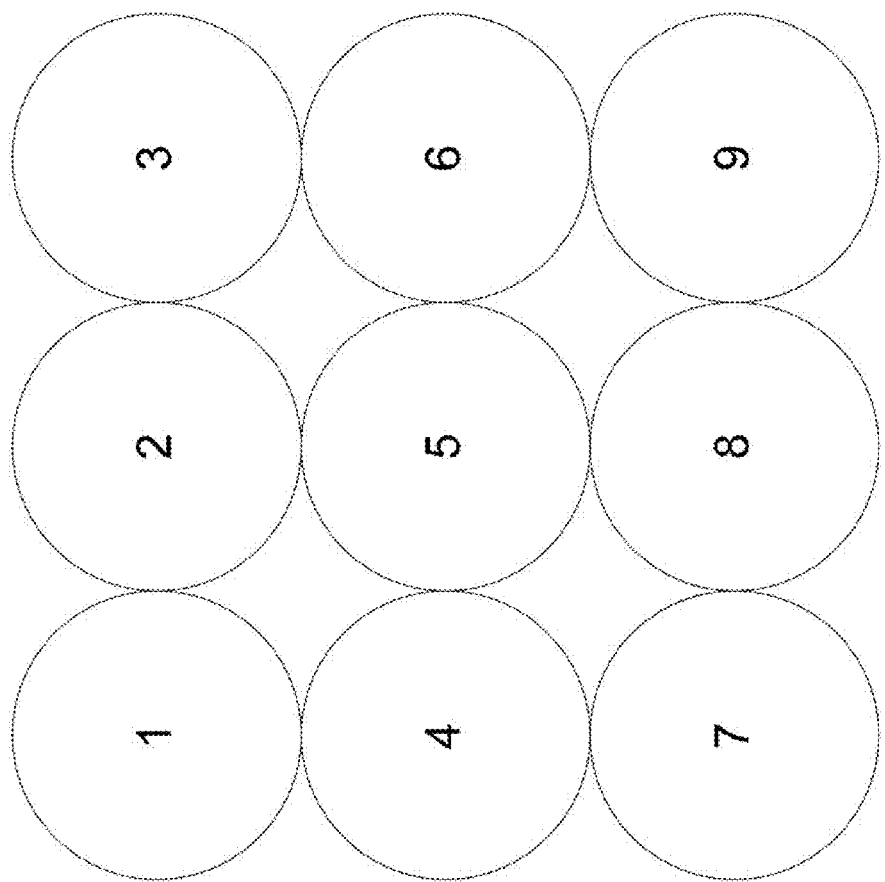
FIG. 7 illustrates a bundle of current carrying cables.

FIG. 7 illustrates an exemplary conventional example of a bundle 10 of current carrying cables 1-9. Cable 5, being in the center of the bundle, will be the warmest because it is surrounded by the other cables. The following heat transfer equations may be used to determine the temperature of the cable at a given temperature for a given current capacity.

Conduction: $q'' = -k(dT/dx)$

Convection: $q'' = hdT$

Equivalent Resistance Method: $Q = \Delta T / R_{tot}$

Given these equations, the temperature for a given gauge of cable can be determined. In the example where cables 1-9 are 10 AWG wires at 20° C. ambient and 30 amps, the theoretical temperature of cable 5 would be approximately 64.1° C. The theoretical temperature of the same cable when using a cooling disk according to aspects of the invention (see FIGS. 1-2) would be 48° C. When tested empirically at 20° C. ambient (derated), the temperature for cable 5 was 53° C. And when tested in the configuration shown in FIG. 1, the temperature for cable 5 was 36° C. This is a substantial (~32%) decrease in the cable temperature.

In an embodiment, one or more cooling discs are used with current carrying cables to prevent heat buildup. FIG. 1 illustrates a cooling system 100, which includes a plurality of disc-type cooling members 102 and a number of current carrying cables 104 connected thereto. By way of example only, one end of the cables 104 may couple to a power supply device, while the other end of the cables 104 may couple to one or more computing devices (not shown).

In the example illustrated, the cooling members 102 support and space apart 9 cables 104. However, any number of cables 104 may be connected to (and supported by) the cooling members 102. The number of cables 104 may be limited due to the diameter of the cables, the diameter of the cooling members and/or the load carried by the cables. FIG. 2 illustrates an enlarged view of a series of the cooling members 102 without the cables 104. In one case, the thickness of each cooling member 102 is on the order of 0.25 to 0.5 inches. In other examples, the thickness may be less than 0.25 inches (e.g., 0.15 inches) or greater than 0.5 inches (e.g., 1 inch, 2 inches or more).

In this embodiment, a plurality of cooling members 102 is desirably employed to cool and support the cables 104. The number of cooling members 102 that is used may vary depending upon the system configuration. For instance, depending upon how many feet or meters the cables must span, there may be only a few cooling members used (e.g., 2-5), or a dozen or more may be used. Desirably, cooling members 102 are spaced apart on the order of every 6 or 12 inches along the length of the cable bundle.

Figure 3A:
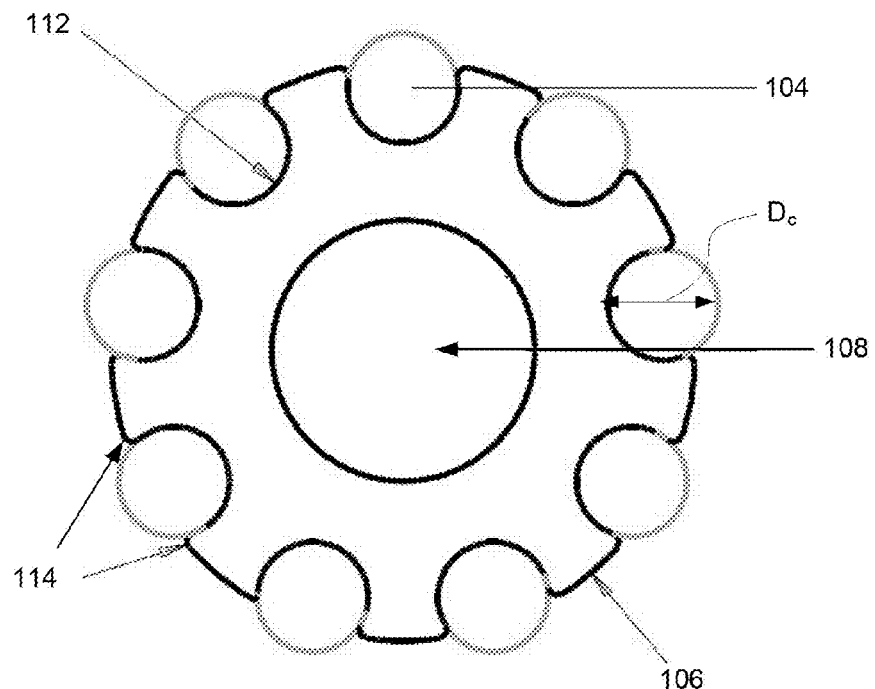
FIGS. 3A-B illustrate features of a cooling system in accordance with aspects of the invention.
Figure 3B:
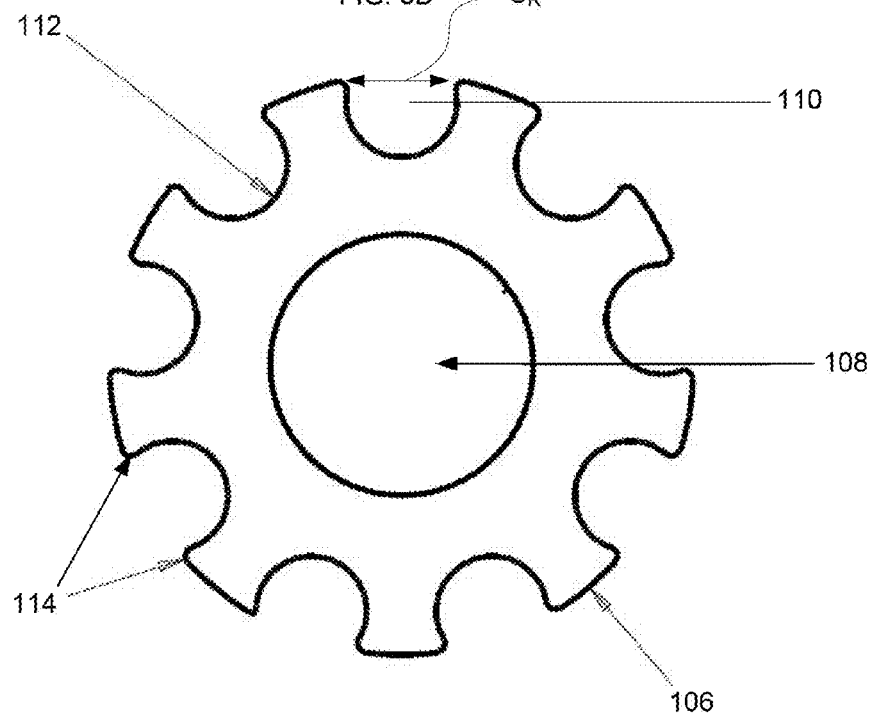

FIGS. 3A-B illustrate a front or cutaway view of a cooling member 102 with and without the cables 104, respectively. The front or rear side (or cutaway cross section) shown in this example illustrates that the cooling member 102 may have a generally circular perimeter 106. The cooling member 102 may also include an inner perimeter defining a generally circular central opening 108. The central opening 108 is preferably equidistant from the cables 104.

In one example, the outer diameter ("OD") of the cooling member 102 is determined according to the following equation:

$$OD = n * d_c \left( \frac{1}{\pi} + \frac{1}{3} \right)$$

where n is equal to the number of conductors and $d_c$ is the conductor diameter.

In another example the diameter of the inner central opening ("ID") is determined according to the following equation:

$$ID = \left( \frac{0.85 * n * d_c}{\pi} \right)$$

In a further example, the offset between adjacent cables (centerline to centerline) is determined according to the following equation:

$$\text{Offset} = \left( \frac{OD}{2} - \frac{0.75 * d_c}{2} \right)$$

The spacing between each adjacent cable may be in radial coordinates or in degrees and radius (or offset). Radial coordinates (θ) may be used according to θ=360/n (in units of degrees).

FIG. 3B shows that the cooling member 102 includes receptacles 110 for each of the cables 104. In this example, the receptacles 110 are formed as arcuate or semicircular notches 112 disposed along the perimeter 106. Here, the receptacles include opposing outer lips 114 on either side, which desirably are formed along the perimeter 106. The outer lips 114 help protect the cables when installing them into the slots/receptacles. The receptacles 110 are desirably uniformly distributed along the perimeter 106. The outer lips 114 forming the opening to a given receptacle have a smaller spacing ($S_R$ in FIG. 3B) between them than the diameter ($D_C$ in FIG. 3A). $D_c$ represents the diameter of the slot/receptacle where the cable is received. $D_c$ is desirably optimized for mechanical and thermal reasons. Spacing $S_R$ need not be substantially smaller than the diameter $D_C$; but rather allows for the cable to be easily snapped into place or otherwise secured while permitting removal from the receptacle without damaging the cable.

While the receptacles 110 are shown as being substantially semicircular or arcuate, other shapes conforming to the cross-sectional configuration of the cables 104 may be employed. Similarly, the perimeter 106 and/or the central opening 108 may have non-circular geometric shapes. By way of example only, the central opening and the perimeter may be hexagonal, octagonal, nonagon, decagon, etc. These shapes may be chosen depending upon the number of cables the cooling member 102 supports.

The central opening 108, the spacing between cables along the periphery of the cooling members 102, and the spacing between neighboring cooling members all promote air cooling of the cables. In one example, the cooling members 102 also function as an insulated surface or a non-conductor. More specifically, the cooling members are desirably thermal and electric insulators. Thus, the cooling members in this case do not act as heat sinks. They also act to decouple the effects of cables acting on other cables in a bundle, for instance by reducing induction effects between cables.

In one alternative, the cooling members are formed of plastic or a thermoplastic polymer such as polyvinyl chloride ("PVC"). The material (or materials) used to fabricate the cooling members should be selected to withstand the same or higher temperatures as those of the insulation temperature ratings for the cables that are to be cooled. In one example, the cooling members are made via an injection molding process, although other processes may be employed.

Figure 4:
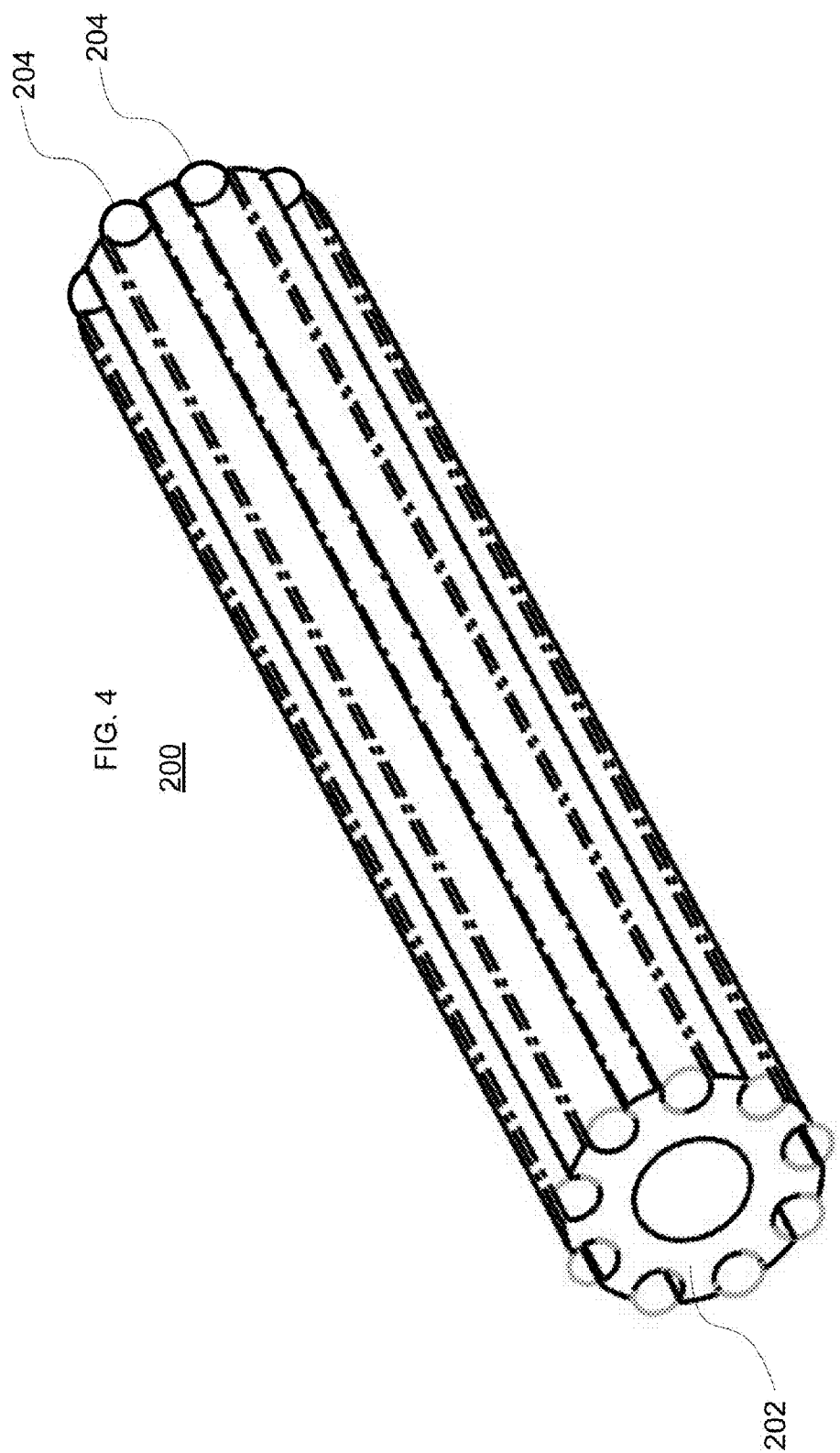
FIG. 4 illustrates another cooling system configuration in accordance with aspects of the invention.
Figure 5:
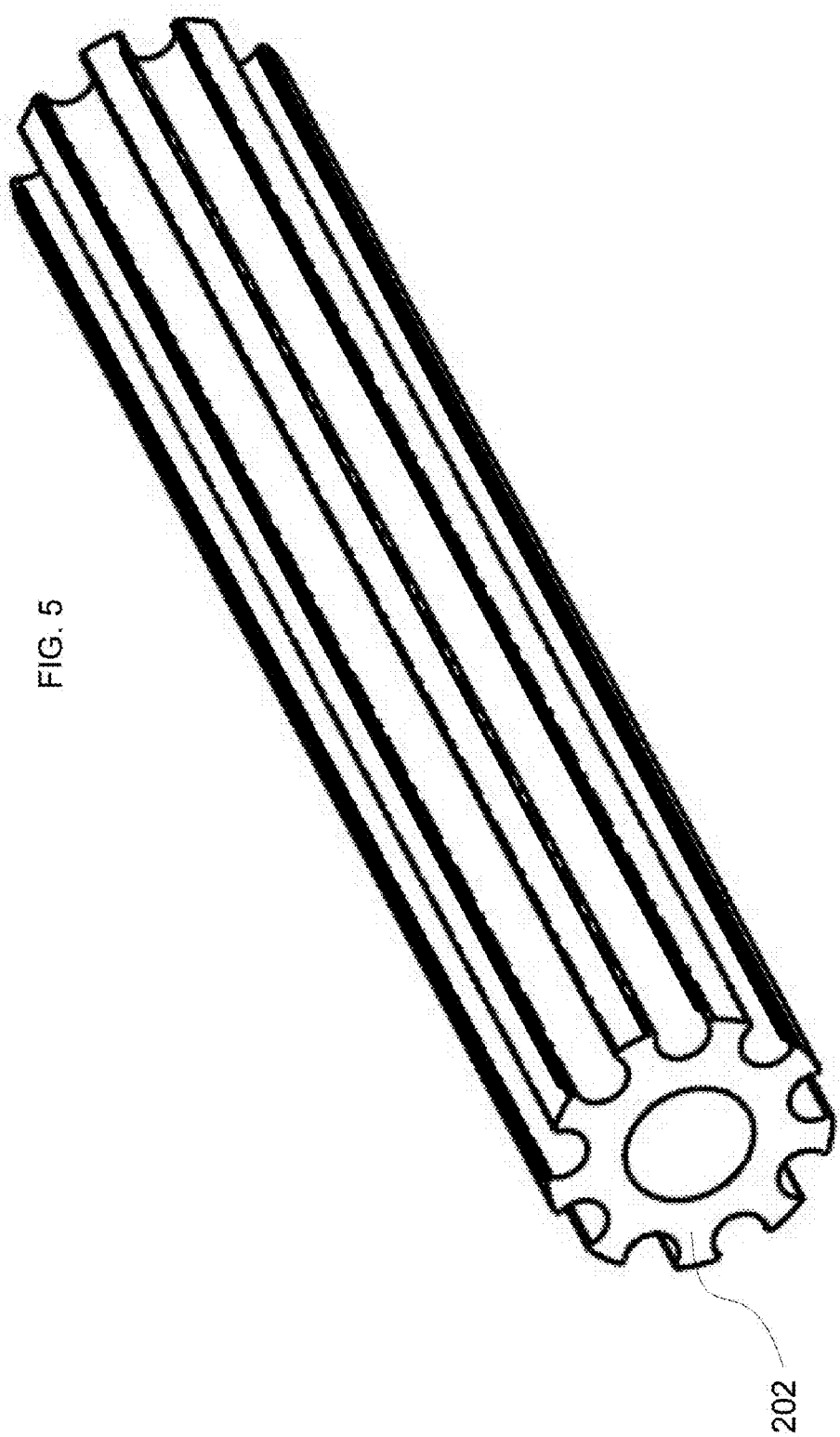
FIG. 5 illustrates features of the system of FIG. 4.

FIGS. 4 and 5 illustrate an alternative cooling member configuration in accordance with additional aspects of the invention. In this configuration, an elongated disc-type cooling member 202 is formed. The member 202 may be extruded in a preconfigured length. According to one embodiment, the member 202 may be cut or separated into a number of thinner cooling members 102. As shown in FIG. 4, cooling system 200, which includes elongated disc-type cooling member 202 that may be used with number of current carrying cables 204 connected thereto. As with the embodiment of FIG. 1, one end of the cables 204 may couple to a power supply device, while the other end of the cables 204 may couple to one or more computing devices (not shown).

In the example illustrated, the cooling member 202 support and space apart 9 cables 204. However, any number of cables 204 may be connected to (and supported by) the cooling members 202. The number of cables 204 may be limited due to the diameter of the cables, the diameter of the cooling members and/or the load carried by the cables. FIG. 5 illustrates a view of the cooling member 202 without the cables 204.

In this embodiment, a single cooling member 202 may be employed to cool and support the cables 204. The number of cooling members 202 that are used may vary depending upon the system configuration. For instance, depending upon how many feet or meters the cables must span, there may be only one cooling member 202 used, or a plurality of cooling members 202 may be used. The cooling member(s) 202 may be used alone or in combination with the cooling member 102 discussed above.

The cross-sectional configuration of the cooling member 202 is desirably equivalent to the configuration of the cooling member 102 shown in FIGS. 3A-B. Thus, the cooling member 202 may have the generally circular perimeter 106. The cooling member 202 may also include the generally circular central opening 108.

Similarly, the receptacles 110 may be formed as arcuate or semicircular notches 112 disposed along the perimeter 106. And as with cooling member 102, the receptacles for cooling member 202 may include opposing outer lips 114 on either side, which desirably are formed along the perimeter 106. The outer lips 114 forming the opening to a given receptacle have a smaller spacing ($S_R$ in FIG. 3B) between them than the diameter $D_C$ in FIG. 3A). Spacing $S_R$ need not be substantially smaller than the diameter $D_C$; but rather allows for the cable to be easily snapped into place or otherwise secured while permitting removal from the receptacle without damaging the cable.

While the receptacles 110 for cooling member 202 may be substantially semicircular or arcuate, other shapes conforming to the cross-sectional configuration of the cables 204 may be employed. Similarly, the perimeter 106 and/or the central opening 108 may have non-circular geometric shapes. By way of example only, the central opening and the perimeter may be hexagonal, octagonal, nonagon, decagon, etc. These shapes may be chosen depending upon the number of cables the cooling member 102 supports.

The central opening 108 and the spacing between cables along the periphery of the cooling members 102 promote air cooling of the cables. In one example, the cooling member 202 also functions as an insulated surface. More specifically, the cooling member 202 is desirably a thermal and electric insulator. Thus, the cooling member in this case does not act as a heat sink. Rather, it acts to decouple the effects of cables acting on other cables in a bundle.

Figure 6:
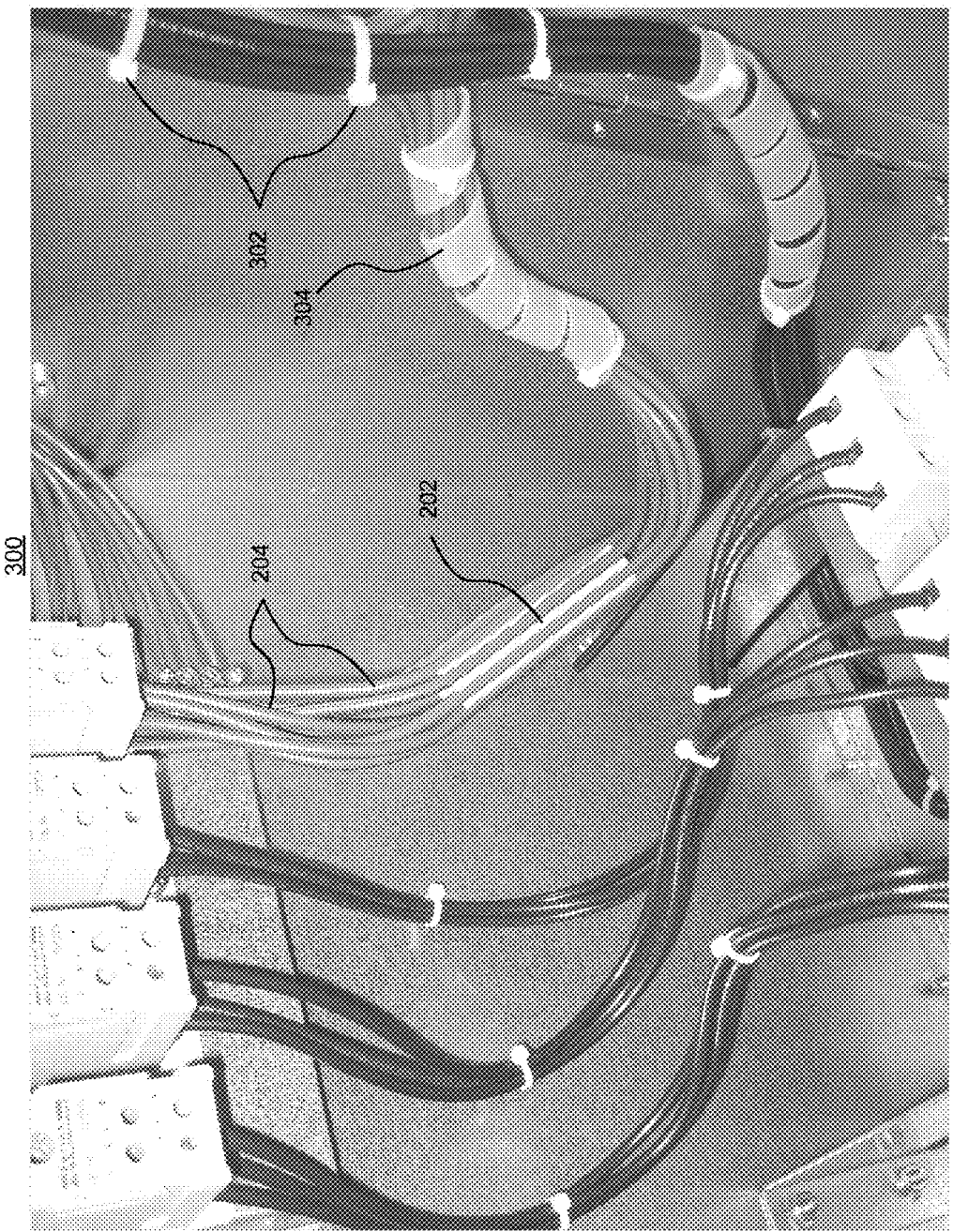
FIG. 6 is an image showing the use of a cooling member in accordance with aspects of the invention.

FIG. 6 illustrates a configuration 300 illustrating one of the cooling members 202 for cooling a plurality of cables 204 in an enclosure. This configuration 300 also shows the use of conventional cable ties 302 and wraps 304, which bundle the cables 204, which can be detrimental to the heat dissipation of the cables, particularly the cables in the interior of the bundle. While a cooling member 202 is shown, cooling members 102 may be used in place of or in combination with cooling member 202. The use of such cooling members may reduce the temperature among the cables within a bundle by 15 degrees Celsius or more as discussed above.

Although aspects of the invention herein have been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims.

The invention claimed is:

1. A cooling apparatus, comprising:
at least one cooling member having an outer perimeter and an inner perimeter, the outer perimeter including a plurality of receptacles for receiving a corresponding one of a plurality of current carrying cables, the inner perimeter defining a central opening;
the outer perimeter being defined according to the following equation:

$$OD = n * d_c \left( \frac{1}{\pi} + \frac{1}{3} \right),$$

the inner perimeter being defined according to the following equation:

$$ID = \left( \frac{0.85 * n * d_c}{\pi} \right),$$

where n is equal to a number of the plurality of current carrying cables and $d_c$ is the corresponding cable diameter;
wherein each receptacle has a cross-sectional size conforming to a cross-sectional size of the corresponding cable, and each receptacle has a pair of opposing outer lips having a spacing therebetween, the spacing being less than a diameter of the corresponding cable;
wherein each corresponding cable is received at an offset from an adjacent corresponding cable, the offset being defined by the following equation:

$$\textit{offset} = \left( \frac{OD}{2} - \frac{0.75 * d_c}{2} \right),$$

where the offset is equal to a distance from a center of the corresponding cable diameter to a center of the adjacent corresponding cable diameter.

2. The cooling apparatus of claim 1, wherein the receptacles have a generally arcuate shape.

3. The cooling apparatus of claim 2, wherein the inner perimeter is generally circular.

4. The cooling apparatus of claim 1, wherein the at least one cooling member is a thermal and electric insulator.

5. The cooling apparatus of claim 4, wherein the at least one cooling member comprises a thermoplastic polymer.

6. The cooling apparatus of claim 4, wherein the at least one cooling member is operable to provide thermal insulation for reducing a temperature among the plurality of current carrying cables by at least 15 degrees Celsius.

7. The cooling apparatus of claim 1, wherein the at least one cooling member has a first side and a second side defining a thickness therebetween, the thickness being of less than one inch.

8. The cooling apparatus of claim 1, wherein the at least one cooling member has a first side and a second side defining a thickness therebetween, the thickness being between about 0.25 to 0.5 inches.

9. A cooling system, comprising:

a plurality of cooling members each having an outer perimeter and an inner perimeter, the outer perimeter including a plurality of receptacles therealong, and the inner perimeter defining a central opening;

the outer perimeter being defined according to the following equation:

$$OD = n * d_c \left( \frac{1}{\pi} + \frac{1}{3} \right),$$

the inner perimeter being defined according to the following equation:

$$ID = \left( \frac{0.85 * n * d_c}{\pi} \right),$$

where n is equal to a number of the plurality of current carrying cables and $d_c$ is the corresponding cable diameter;

a plurality of cables configured to handle current loads, each of the plurality of cables generating heat in relation to its current load, where each of the plurality of cables has a cross-sectional size;

wherein each receptacle receives a corresponding one of the plurality of cables, each receptacle has a cross-sectional size conforming to the cross-sectional size of the corresponding cable, and each receptacle has a pair of opposing outer lips having a spacing therebetween, the spacing being less than a diameter of the corresponding cable;

wherein each corresponding cable is received at an offset from an adjacent corresponding cable, the offset being defined by the following equation:

$$\text{offset} = \left( \frac{OD}{2} - \frac{0.75 * d_c}{2} \right),$$

where the offset is equal to a distance from a center of the corresponding cable diameter to a center of the adjacent corresponding cable diameter.

10. The cooling system of claim 9, wherein the receptacles have a generally arcuate shape.

11. The cooling system of claim 10, wherein the inner perimeter is generally circular.

12. The cooling system of claim 9, wherein the cooling members are thermal and electric insulators.

13. The cooling system of claim 12, wherein the cooling members comprise a thermoplastic polymer.

14. The cooling system of claim 12, wherein the cooling members are operable to provide thermal insulation for reducing a temperature among the plurality of cables by at least 15 degrees Celsius.

15. The cooling system of claim 9, wherein each of the plurality of cooling members has a first side and a second side defining a thickness therebetween, the thickness being of less than one inch.

16. The cooling system of claim 15, wherein each cooling member is spaced apart from any neighboring cooling members by at least about 6 inches.

17. The cooling system of claim 15, wherein each cooling member is spaced apart from any neighboring cooling members by less than about 12 inches.

* * * * *